United States Patent [19]

Tsumura et al.

[11] 3,868,303

[45] Feb. 25, 1975

[54] METHOD OF PRODUCING ENZYME AND ITS UTILIZATION THEREOF

[75] Inventors: Nobuzo Tsumura, Tokyo; Shoji Yanai, Funabashi; Masako Ishikawa, Yokohama, all of Japan

[73] Assignee: Director of National Food Research Institute, Tokyo, Japan

[22] Filed: Nov. 6, 1972

[21] Appl. No.: 304,205

[52] U.S. Cl................. 195/2, 195/29, 195/65
[51] Int. Cl.............................................. C12d 13/10
[58] Field of Search................... 195/65, 66 R, 62, 2

[56] References Cited
UNITED STATES PATENTS

| | | | |
|---|---|---|---|
| 3,330,738 | 7/1967 | Napier | 195/66 R |
| 3,649,454 | 3/1972 | Isono et al. | 195/62 |
| 3,682,778 | 8/1972 | Kawai et al. | 195/66 R |
| 3,716,452 | 2/1973 | Kitamura et al. | 195/65 X |

Primary Examiner—Lionel M. Shapiro
Attorney, Agent, or Firm—McGlew and Tuttle

[57] ABSTRACT

Process for producing a lytic enzyme from a new strain of microorganism *Achromobacter lunatus*, e.g. EU-889, ATCC No. 21817, comprises cultivating the new strain and harvesting the nzyme from the cultured broth or from the living cells. Also a process is provided for dissolving living and dead cells of microorganisms and constituents of cell walls using the new lytic enzyme.

18 Claims, 1 Drawing Figure

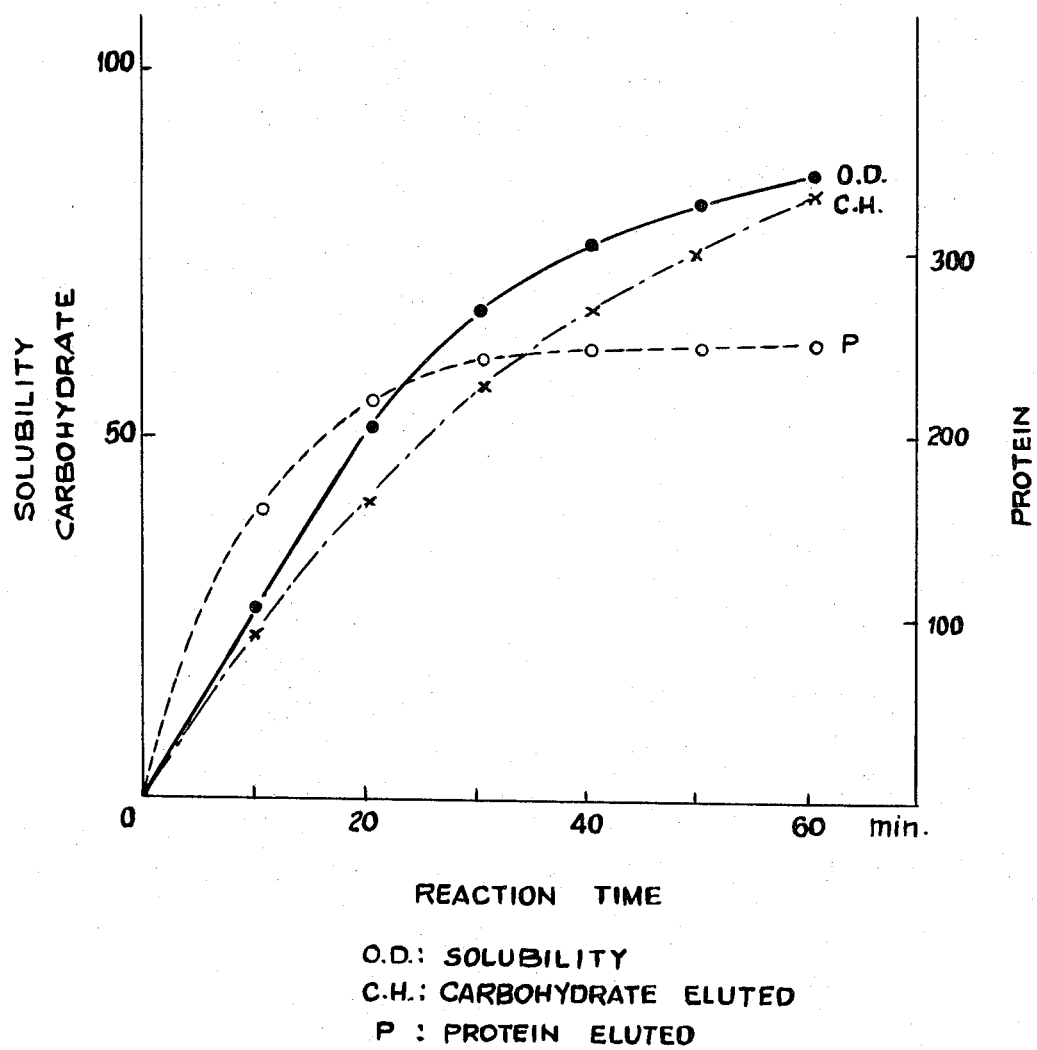

METHOD OF PRODUCING ENZYME AND ITS UTILIZATION THEREOF

BACKGROUND AND SUMMARY OF THE INVENTION

This invention relates to a method of producing lytic enzyme and to a method of dissolving various kinds of living and dead microorganisms or their constituents by using the enzyme.

The enzyme is produced by cultivating a new strain *Achromobacter lunatus* and is harvested from the cultured broth and/or from the living cells.

The enzyme of this invention show high lytic activity and is useful not only against dead cells of microorganisms and constituents of cell walls, but also against living cells thereof.

For an understanding of the principles of the invention, reference is made to the following description of typical embodiments thereof as illustrated in the accompanying drawing.

BRIEF DESCRIPTION OF THE DRAWING

In the Drawing:

The drawing illustrates the lytic acticity of the invention and shows that carbohydrates and nitrogen compounds are dissolved out with lysis of heat treated baker's yeast cells when the cultured broth of the new strain *Achromobacter lunatus* according to the invention is used as an enzyme source. The drawing is understood more fully by the detailed description which follows.

DETAILED DESCRIPTION OF THE INVENTION

This invention relates to a method for producing lytic enzyme by cultivating a certain bacteria and a method to dissolve the cells of microorganisms or their constituents.

Enzymes have been previously reported having ability to dissolve the cells or the cell walls of yeasts, bacteria, moulds and the like. Thus, enzymes from various origins, i.e. those yielded by bacteria, actinomyces, moulds, basidiomycetes etc. have been reported up to the present date with such ability. Many of them act well on the dead cells of microorganisms treated by heating or by other methods, or upon the constituents of the cell walls prepared from such cells. However these enzymes do not always act on living cells.

Therefore, we have isolated strains of microorganisms from soils of various regions for the purpose of obtaining enzymes which show high lytic activity not only on dead cells of microorganisms or the constituents of cell walls, but also on living cells, and we have inspected the reproducibility of such enzymes.

As a result, several strains of microorganisms could be separated which produced enzymes which in turn show strong dissolving activity on various kinds of microorganisms. These strains have been named respectively EU-889 (deposited in Fermentation Research Institute, Agency of Industrial Science and Technology, JAPAN and assigned the FERM-P No. 995, and also deposited with the American Type Culture collection, Rockville, Maryland, U.S.A. and assigned the ATCC No. 21 817): EU-2032 (deposited in Fermentation Research Institute, Agency of Industrial Science and Technology, JAPAN and assigned the FERM-P No. 994, and also deposited with the American Type Culture Collection, Rockville, Maryland, U.S.A. and assigned the ATCC No. 21 818), EU-819 and EU-1349, all of which are determined to belong to the same species.

Microbiological properties of the foregoing identified strains are listed below as follows. Here the experimental method for the identification thereof is, unless otherwise specified, mainly carried out according to the "Manuel of Microbiological Methods" M. J. Pelczar, Jr. McGraw-Hill, 1957. Incubation was usually performed at 28°C.

Rod cells are found of a size from 0.3 to 0.5 by 1.5 to 4.0 microns on nutrient agar; occasionally the cell may attain a length of 5.0 to 7.0 microns.

Slightly curved cells are found. Old cultures contain many small rods 0.3 to 0.5 by 1.5 microns, which arise from the fragmentation of the longer rods. In old cultures on nutrient agar, the cells undergo autolysis usually after 7 days. In Ball and Seller's media (gelatin media) long and frequently knobbed form are observed, and in old cultures the cells show spindle shaped rods with pointed ends, straight or curved, frequently in chains.

Non-motile cells are observed. Gram-negative cells which are not acid-fast are found but Metachromatic granules are not found and spores are not formed.

Nutrient agar colonies are observed. Circular cells are found, 3.0 to 4.0 mm (7 days). The cells are entire, convex, smooth or slightly rough, dull or glistening, opaque, cream to cream yellow (3 to 4 days) and pale, yellowish brown to dark brown (after 5 days), butyrous.

Nutrient agar slant cells are seen exhibiting moderate growth, filiform, rised, dull or glistening, opaque, cream or pale yellowish brown, medium becoming dark brown usually after 4 to 5 days. (Nutrient agar containing 0.1% tyrosine becomes dark brown to black much faster).

Glutamate agar slant cells show scanty growth, glistening, colorless to yellowish gray.

Nutrient broth: Ring, moderate growth, slight sediment.

Gelatin stab: Stratiform liquefaction in 5 to 7 days at 20°C, surface growth cream colored.

Milk: Yellowish surface growth, peptonized.

Litmus milk: Alkaline, peptonized. utilized

Nitrate respiration: Negative.

Nitrate is not reduced to nitrite in nitrate and succinate-nitrate broth.

Hydrogen sulfide is produced in cystein media (feeble).

Indol is not produced.

Acetylmethyl carbinol is not produced.

Starch is not hydrolyzed.

No acid and no gas are formed from glucose, sucrose and lactose by Hugh and Leifson's method. Growth but no acid and no gas is produced from glycerol, xylose, arabinose, glucose, galactose, fructose, sucrose, maltose lactose, mannitol and starch in peptone media, and slight alkaline reaction is obtained from xylose, arabinose, galactose, glycerol and mannitol. Slightly acid is produced from glucose, fructose and maltose in 14 to 20 days in synthetic media. No growth is observed in synthetic media containing xylose, arabinose, galactose, glycerol and mannitol.

Glucose, citrate, succinate are utlized. Galactose, gluconate, 2-ketogluconate, benzoate are not utilized as a sole carbon source with ammoniacal nitrogen.

Aspargine is utilized and sodium nitrate, creatin, creatinine, urea are not utilized as a sole nitrogen source.

Arginine is not hydrolyzed (by Thonley's method).
Urease is not produced.
Cytochrome oxidase: Positive.
Catalase: Positive.
Optimum temperature: 25°–30°C.
Optimum pH: 7.2 to 8.2, min. 5.5, max. 11.3
Aerobe.
Source: Soil.

As stated above, when these strains are cultivated on nutrient agar slant, the medium gets blackish gradually, and cells autolyze in about 7 days incubation. When glucose is contained in the medium, cells become short rod shapes but do not autolyze, and blackening occurrence is less or never appears. As mentioned before, on gelatin-containing medium, these strains show particular metamorphosis and finally form sickle cells, which however, revert into ordinary forms again by inoculation of the said cells on nutrient agar medium or bouillon. Polymorphism of cells is characteristic of Arthrobacter and Corynebacterium and the like, but no corresponding phenomenon was noticed when 3–5 strains of Arthrobacter, Corynebacterium, Pseudomonas, Acromobacter, Erwinia, Escherichia are examined for the occurrence of the above polymorphism on the medium containing gelatin.

Recently *Psuedomonas melanogenum* (H. Iizuka and K. Komagata, Agr. Biol. Chem., 37, 71, 1963) and Achromobacter brunificances (H. Ogawa, et al., J. of the Food Hygienic Soc. of Japan, 11, 352, 1970) have been reported as bacteria to darken or blacken medium, but the former is Pseudomonas which has polar flagella, and is different from the latter in such points as in its activity on milk and gelatin, in its way of utilization of saccharide, its assimilation of carbon compound and its range of growth temperature and pH.

Therefore, these strains are considered to belong to Acromobacter from such evidence as, Gram's stain, motility, the way of utilization of saccharide and hydrolysis of arginin. However, on comparison of the description of these strains with species described in the sixth and seventh editions of Bergy's Manual of Determinative Bacteriology, there is not the same species thereof. Thus, it is concluded that these strains are a new species and we have named it *Achromobacter lunatus* according to the morphological characteristic of these strains on gelatin medium.

The properites of lytic enzymes produced by cultivation of these strains are as follows. On liquid culture, lytic enzymes are produced in the cultivated liquor, and are also contained in the grown cell. The action of these enzymes is noticed in the wide range of pH 6–9.5 and is especially high in slightly alkaline range of pH 7.5–8.5. The enzyme is stable at the range of pH 5.5–7.0. Optimum temperature for the reaction is around 55°C and loss of activity occurs gradually over 40°C. Enzyme action is partly inhibited by the presence of NaCl more than 0.2%.

Measurement of lytic activity was carried out by putting 5 ml of reaction mixture which contains about 0.06% (w/v) of dried substrate microorganism in the cell of spectrophotometer, followed by reaction at 40°C and reading the change of transmittance at 660 mμ.

As substrate, were used living cells and heat treated (15 minutes at 100°C) cells of baker's yeast, other yeasts, bacteria, actinomyces, moulds, and washed and dried residue of autolyzed baker's yeast (AWY hereunder) etc. When the concentrate of the cultured broth of these strains according to the invention was submitted to polyacrylamide gell electrophoresis at pH 8.4, there were found out at least 4 kinds of active constituents which have lytic effect on baker's yeast or AWY. Thus, the preparation of this invention is considered to be a mixture of several lytic enzymes. As shown in the figure of the drawing along with the progressing of lytic action, carbohydrates which are positive to Anthron reaction and nitrogen compounds which are positive to Lorry's phenol reagent are changed to be soluble. Further, because laminarin and casein are decomposed by the enzymes, it is clear that the enzymes produced by these strains contain glucanase and protease. The enzymes of this invention dissolve heat treated cells of various microorganisms effectively, but are most characteristic in strong lysis of living cells of various kinds of yeasts, actinomyces, bacteria and moulds as well.

This invention is further illustrated in the following examples, which examples are not to be considered to limit the invention. Unless otherwise specified %'s are by weight.

EXAMPLE 1

Strain EU-889 (identified hereinabove) was inoculated into a medium (pH 7.0) containing 0.5% pepton, 0.2% meat extract, 0.1% yeast extract, 0.05% $MgSO_4 \cdot 7H_2O$, 0.5% NaCl and 1.0% carbohydrate and cultivated at 30°C for 48 hours by shaking. After cultivation cells were removed by centrifuge and the lytic activity of enzyme in the liquor was assayed. The result is as shown in Table I. Though this strain produced lytic enzyme without addition of carbohydrate to the medium, it produced enzyme more strongly by addition of various kinds of carbohydrate and materials containing carbohydrate.

TABLE I

| Carbohydrate in the medium | Solubility of substrate, %* | |
|---|---|---|
| | PY ** | AWY |
| Non | 16.1 | 25.8 |
| Xylose | 12.8 | 42.2 |
| Ribose | 19.5 | 65.0 |
| Glucose | 28.4 | 66.6 |
| Fructose | 24.4 | 55.5 |
| Maltose | 22.9 | 67.8 |
| Lactose | 28.2 | 61.2 |
| Saccharose | 24.3 | 55.5 |
| Cellobiose | 21.4 | 65.1 |
| Raffinose | 18.0 | 53.5 |
| Sorbitol | 20.7 | 32.6 |
| Maltitol | 15.9 | 36.8 |
| Glucosamine | 8.6 | 70.9 |
| Glycogen | 24.6 | 70.5 |
| Starch | 13.7 | 62.4 |
| Laminarin | 22.1 | 69.2 |
| Yeast cell | 13.3 | 72.2 |
| AWY | 10.9 | 70.4 |

*Reaction mixtures contained 1 ml of cultivated mother liquor in total 5 ml and were incubated for 30 minutes at 40°C. The numerical value calculated from the following formula was expressed as a solubility:

$$Do-D_{30}/Do \times 100$$

Do: Initial O.D.
$D_{30}$: O.D. after reaction for 30 min.
**Heat treated baker's yeast (100°C for 15 minutes).

EXAMPLE 2

Strain EU-2032 (identified hereinabove) was inoculated in two media, one of which consisted of the constituents of the medium shown in Example 1 (containing 1% glucose as carbohydrate, hereunder called medium A) and the other contained 0.2% $(NH_4)_2HPO_4$, 0.2% $KH_2PO_4$, 0.05% $MgSO_4 \cdot 7H_2O$, 1% glucose (hereunder called medium B) and then cultivated by shaking at 30°C for 48 hours. After incubation, the lytic activity of the cultivated liquor was assayed. The result is shown in Table II, from which it is apparent that this strain produces lytic enzyme in cultivation with only inorganic nitrogen sources.

TABLE II

| Medium | Solubility of substrate %* | |
|---|---|---|
| | PY | AWY |
| A | 39.2 | 71.0 |
| B | 53.2 | 39.0 |

* Same as Table I.

EXAMPLE 3

Strain EU-889 was inoculated in medium A of Example 2 and cultivated by shaking for 48 hours at 30°C. After cultivation, the lytic activity of the cultivated liquor on various microorganisms was assayed. The reaction mixture contained 5% (v/v) cultivated mother liquor as enzyme source in total volume and about 0.06% (w/v, as dry matter) of intact cells or heat treated cells (at 100°C for 15 minutes) of various kinds of microorganisms. The optical densities (O.D.) of the reaction mixture before and after the incubation for 30 min. at 40°C were determined. The lytic activity was expressed by the following calculation of formula:

$$(D_0 - D_{30}/D_0) \times 100$$

$D_0$: O.D. at initial time
$D_{30}$: O.D. after the reaction for 30 min.

Cells of Actinomyces and moulds, difficult to disperse homogenously, were crushed by homogenizer and made into suspension as homogenous as possible. As shown in Table III, the results clearly show that the enzyme has lytic effect on various kinds of microorganisms.

TABLE III

| Substrate | Lytic Activity | |
|---|---|---|
| | Living cells | Heat treated cells |
| Baker's yeast | ± | + + |
| Candida utilis | + + + | + + + |
| C. petrophilum | | + + |
| Streptomyces griseus | + + + + | + + + + |
| S. albus | + + + + | + + + + |
| S. phaeochromogenes | + + + | |
| S. fradiae | + + + | |
| S. californicus | + + + | + + + |
| S. aureus | + + | + + |
| Xanthomonas oryzae | + + + | + + + |
| X. citri | ± | + + + + |
| X. pruni | + + | + + + + |
| X. campestris | + + | + + + + |
| Pseudomonas aeruginosa | + | + + + + |
| P. solanacearum | + + + | + + + + |
| P. striafaciens | + + | + + + + |
| Corynebacterium rathayi | + | + + |
| C. michiganense | + + + | + + + + |
| Agrobacterium tumefaciens | + | + |
| Erwinia aroideae | + | + + + + |

TABLE III-Continued

| Substrate | Lytic Activity | |
|---|---|---|
| | Living cells | Heat treated cells |
| Escherichia coli | ± | + + + + |
| Bacillus subtilis | + + + | + + + |
| Fusarium sp. | + + | + + |
| Rhizopus kansho | + | |

±: 5%>,
+: 5–30%,
+ +: 30–60%,
+ + +: 60–90%,
+ + + +: 90%<

EXAMPLE 4

Cells harvested from the culture broth of Example 3 were washed with 0.85% saline solution and de-ionized water. The cells were suspended in water of the same volume of original culture broth and disintegrated by sonicator at 10 kc for 15 minutes with cooling. Then, the treated suspension was centrifuged to remove cell debris and the supernatant liquid was obtained. The supernatant had little lytic activity on heat treated baker's yeast, but showed considerably strong lytic activity on AWY; it was 42% based on the activity of initial cultured broth by the assay using similar conditions as in the Example 3.

EXAMPLE 5

Cultivated mother liquor obtained by a similar method as in Example 3 was concentrated by filtration through collodion membrane. (Alternately other filters, or dialysis with addition of ammonium sulfate to 0.8 saturation are used to concentrate the mother liquor.) Then, dried enzyme was obtained from the so-obtained concentrate by freeze drying. (Alternatively, the enzyme is obtained by dehydration with acetone or ethanol.) The lytic activity of the so-obtained dried enzyme fluctuates with drying method or substrate to be reacted, but 65–95% activity based on initial cultured broth was retained.

EXAMPLE 6

400 grams of dried cells of *Candida petrophilum*, which was propagated in the medium containing normal alkane as carbon source, was mixed with 2 L of water and 2 grams of enzyme which was prepared by precipitation with 70% ethanol from the mother liquor of EU-889 strain cultivation in the medium A and by following dehydration in vacuo. The mixed suspension was adjusted to pH 7.0 with NaOH solution and incubated for 8 hours at 55°C. After the reaction, the mixture was centrifuged and the residue was removed. The supernatant liquid was concentrated in vacuo at 60°C and about 300 ml of concentrated syrup was obtained. The yields of nitrogen compounds and saccharide in the syrup were both 73% based on the amounts in the initial dried cell.

While specific embodiments of the invention have been shown and described in detail to illustrate the application of the principles of the invention, it will be understood that the invention may be embodied otherwise without departing from such principles.

What is claimed is:

1. A method for producing lytic enzyme to dissolve living and dead cells of various kinds of microorganisms and also their constituents which comprises; cultivating a new strain *Achromobacter lunatus* to produce the enzyme in the cultured broth and/or in the living cells and harvesting the enzyme.

2. A method for dissolving living and dead cells of various kinds of microorganisms and also their constituents by using the enzyme prepared as in claim 1.

3. Process of producing a lytic enzyme which comprises;
cultivating a strain of *Achromobacter lunatus* in a cultivating medium containing sufficient components to produce lytic enzyme,
continuing said cultivating for a time sufficient to obtain enzyme of substantial lytic activity therefrom, and
thereafter separating and recovering the lytic enzyme in said medium.

4. Process according to claim 3, wherein carbohydrate is added to the medium for cultivating the microorganism.

5. Process according to claim 4, wherein the carbohydrate is a polysaccharide.

6. Process according to claim 4, wherein the carbohydrate is a member selected from the group consisting of xylose, ribose, glucose, fructose, maltose, lactose, saccharose, cellobiose, raffinose, sorbitol, maltitol, glucosamine, glycogen, starch, laminarin, and yeast.

7. Process according to claim 3, wherein the cultivating is carried out at a temperature of from about 30° to about 55°C. for up to about 48 hours.

8. Process according to claim 3, wherein the dissolved cells, after maximum lytic activity has been substantially reached, are separated from the medium and recovered.

9. Process according to claim 3, wherein Achromobacter lunatus comprises the strains EU-889 and EU-2032.

10. Process according to claim 3, wherein the cultivating is carried out at a temperature of from about 30° to about 55°C for up to about 48 hours.

11. Process according to claim 8, wherein the cultivating is carried out at a temperature of from about 30° to about 55°C for up to about 48 hours.

12. Process according to claim 3, wherein said cultivating medium contains sufficient components to produce lytic enzyme, and after cultivation the lytic enzyme is separated and recovered in said medium and in grown cells.

13. Process according to claim 3, wherein the cultivating medium contains inorganic or organic nitrogen sources.

14. Process according to claim 3, wherein the cultivation is carried out at a temperature of from about 25° to 35°C for up to about 60 hours.

15. Process according to claim 3, wherein the enzyme is obtained in liquid state or in dry state.

16. Process according to claim 7, wherein dried enzyme is obtained from the liquid state enzyme by freeze drying or by dehydration with organic solvents, or by salting out with inorganic salts.

17. Process of dissolving cells and constituents thereof which comprises: introducing the enzyme produced from the cultivation of *Achromobacter lunatus* into a suspension containing cells of microorganisms to be dissolved, and continuing the reaction in said suspension for a time sufficient to produce an adequate lysis of cells.

18. Process according to claim 17, wherein the lytic reaction is carried out at a temperature of from about 30° to about 70°C.

* * * * *